United States Patent Office 3,069,473
Patented Dec. 18, 1962

3,069,473
PROCESS OF CHLORINATING
DIMETHYL SULFIDE
Warren S. MacGregor, Camas, Wash., assignor to Crown Zellerbach Corporation, San Francisco, Calif., a corporation of Nevada
No Drawing. Filed June 26, 1961, Ser. No. 119,324
11 Claims. (Cl. 260—609)

This invention relates to a process for chlorinating dimethyl sulfide to form monochloro dimethyl sulfide.

Although monochloro dimethyl sulfide is useful as an industrial solvent and as an intermediate in organic synthesis, its commercial application heretofore has been negligible because of the difficulty of its preparation. Thus its synthesis by the direct chlorination of dimethyl sulfide is a voilent reaction which inflames spontaneously with extensive decomposition of the reactants. To overcome this problem, various expedients have been attempted.

In one of these, dimethyl sulfide has been treated with chlorine in the liquid phase at temperatures below —20° C. This forms an adduct which rearranges to monochloro dimethyl sulfide upon warming to room temperature. However, the rearrangement is explosive and the procedure impractical for commercial application.

In another process, dimethyl sulfide has been dissolved in a solvent which is inert to chlorine, and then treated with chlorine gas at —20° C. This procedure also has proved unsatisfactory on a commercial scale since it is expensive and accompanied by the formation of large quantities of by-product dimethyl methylthiomethyl sulfonium chloride resulting from the interaction of the monochloro dimethyl sulfide, as it is formed, with the unreacted dimethyl sulfide in the reaction vessel.

Thirdly, monochloro dimethyl sulfide has been prepared by direct chlorination of dimethyl sulfide with such chlorinating agents as thionyl chloride, sulfuryl chloride and sulfur monochloride. These processes also are unsuitable for commercial use since the cost of the chlorinating agents is prohibitive, and the processing relative complex.

Accordingly the general object of the present invention is to provide a process for chlorinating dimethyl sulfide to form monochloro dimethyl sulfide continuously, rapidly, in high yields and without the necessity for employing such process-complicating factors as refrigerating the reactants or using solvents which must be recovered.

Generally stated, the process of the present invention comprises reacting dimethyl sulfide and chlorine in the vapor phase at a temperature above the boiling point of the dimethyl sulfide but below the decomposition temperature of monochloro dimethyl sulfide, in the presence of a diluent gas which is substantially non-reactive toward chlorine, dimethyl sulfide and monochloro dimethyl sulfide. The direct reaction in the vapor phase of the two reaction materials in this manner prevents the interaction of the monochloro dimethyl sulfide produced with unreacted dimethyl sulfide to form dimethyl methylthiomethyl sulfonium chloride as an undesired by-product. It also prevents thermal-induced degradation of the sulfur compound components of the reaction mixture.

In carrying out the reaction, dimethyl sulfide obtained from any suitable source such as, for example, by-product dimethyl sulfide derived from paper mill sulfate waste liquor, is introduced continuously into a reaction vessel heated initially to at least 34° C. in order to maintain the dimethyl sulfide, which boils at that temperature, in the vapor state. Contemporaneously there is introduced into the reaction vessel a continuous stream of chlorine gas used in the predetermined proportions.

In general these two reactants should be employed in a substantially 1:1 molar ratio to favor the production of monochloro dimethyl sulfide as opposed to more highly chlorinated products. Also, if less than the stoichiometric amount of chlorine is employed, the excess dimethyl sulfide present in the reaction mixture may react with the monochloro dimethyl sulfide product to form dimethyl methylthiomethyl sulfonium chloride as noted above. On the other hand, if more than the stoichiometric amount of chlorine is used, the production of polychloro dimethyl sulfide derivatives is favored.

Either or both of the gas streams may be diluted with the predetermined proportions of an inert diluent gas. A variety of gases are available for this purpose including hydrogen chloride, nitrogen, helium, argon, carbon dioxide and the like. All of these are substantially inert toward dimethyl sulfide, chlorine and monochloro dimethyl sulfide under the conditions of the reaction.

Hydrogen chloride is a preferred diluent gas since it is effective in controlling the reaction and since it is obtained as a reaction product. Accordingly it is possible to obtain the necessary quantity of hydrogen chloride by removing the organic components from the gaseous product and recycling all or part of the hydrogen chloride residue.

Although the relative proportion of diluent gas to be employed is somewhat variable, a sufficient quantity should be used to control effectively the vigorous reaction between the dimethyl sulfide and chlorine. This requires, in general, at least one mol of the diluent gas for each mol of dimethyl sulfide. The upper limit of use of the diluent gas is determined by that amount which dilutes the reaction mixture to such an extent that the reaction rate is reduced below a practical level or to such an extent that the reaction product is difficult to separate from the reaction mixture.

When hydrogen chloride is employed as the diluent gas, it is preferred to use from 2–10 mols of hydrogen chloride for each mol of dimethyl sulfide. It conveniently may be mixed with the chlorine stream which then is contacted with the dimethyl sulfide gas stream in the reaction zone. However, the hydrogen chloride or other diluent gas may be introduced as a separate stream if desired.

All of the foregoing components of the reaction mixture preferably are used in substantially anhydrous form to prevent oxidative side reactions of the reactants and acid-induced corrosion of the equipment.

As the reactants are introduced continuously into the reaction zone, an immediate and strongly exothermic reaction occurs. This results, when the reaction conditions are controlled as described herein, in the preponderant formation of monochloro dimethyl sulfide.

To avoid decomposition of the components of the reaction mixture, the temperature of the reaction vessel should be controlled, by cooling, or by adjusting the concentration of diluent gas, to a level not above 300° C. A preferred temperature range is from 100–250° C.

The reaction may be run conveniently at atmospheric pressure, although pressures either above or below atmospheric are suitable.

As the reaction progresses, the reaction product is withdrawn continuously from the reaction vessel and condensed in appropriate cooling apparatus to a substantially colorless product containing yields of the order of 80–90% monochloro dimethyl sulfide. This product is separated from any unreacted dimethyl sulfide which may be present by fractional distillation or other suitable procedures.

The presently described process for the preparation of monochloro dimethyl sulfide is described further in the following examples:

*Example 1*

Dimethyl sulfide was vaporized at a controlled rate and passed through a warmed flow meter into a warmed mixing chamber where it was mingled with a metered hydrogen chloride gas stream. The combined gas stream was introduced near one end of a reaction tube through a one millimeter orifice.

A metered chlorine stream was introduced into the same end of the reaction tube from a six millimeter orifice.

An input of 0.026 mol per minute of dimethyl sulfide and chlorine and from 0.05 to 0.08 mol per minute of hydrogen chloride was fed continuously to the reactor. The reaction temperature was 188–197° C.

The gaseous product was withdrawn continuously from the reaction tube and condensed to a pale yellow liquid containing 70% of monochloro dimethyl sulfide and 17% dichloro dimethyl sulfide, produced as a result of the presence of a slight excess of chlorine in the reaction zone.

*Example 2*

Into a reactor similar to that described in Example 1 was introduced a stream of 0.043 mol per minute gaseous dimethyl sulfide through one inlet and through the other a gas stream of 0.042 mol per minute of chlorine and 0.13 mols of hydrogen chloride gas. The reaction zone temperature rose to 210° C. The reaction product contained 85% monochloro dimethyl sulfide.

*Example 3*

In the same apparatus, hydrogen chloride gas was introduced at a steady rate of six liters per minute using varying flows of chlorine and dimethyl sulfide. The reaction temperatures produced by the ensuing reaction are tabulated below:

| Dimethyl sulfide vapor, cc./min. | Chlorine gas, cc./min. | Reaction zone temperature, ° C. |
|---|---|---|
| 1,100 | 1,200 | 259 |
| 2,000 | 2,000 | 280 |
| 2,400 | 2,400 | 300 |
| 3,200 | 3,200 | (1) |

1 Above 400 carbonized.

Thus it is apparent that by the present invention I have provided a continuous, rapid, process for the production of monochloro dimethyl sulfide on a large commercial scale. The necessity for refrigerating the reactants or recovering a solvent is completely eliminated. In addition, the product is produced in very high yield and is readily purified for use in its various commercial applications.

Having thus described my invention in preferred embodiments, I claim as new and desire to protect by Letters Patent:

1. The process of preparing monochloro dimethyl sulfide which comprises reacting dimethyl sulfide and chlorine in the vapor phase at a temperature above the boiling point of dimethyl sulfide but below the decomposition temperature of monochloro dimethyl sulfide and in the presence of a diluent gas which is substantially non-reactive toward the constituents of the reaction mixture.

2. The process of preparing monochloro dimethyl sulfide which comprises reacting dimethyl sulfide and chlorine in the vapor phase at a temperature above the boiling point of dimethyl sulfide but below the decomposition temperature of monochloro dimethyl sulfide and in the presence of a diluent gas which is substantially non-reactive toward dimethyl sulfide, monochloro dimethyl sulfide or chlorine, the diluent gas being used in an amount of at least 1 mol of diluent gas for each mol of dimethyl sulfide.

3. The process of claim 2 wherein the reaction is carried out at a temperature of between 34° and 300° C.

4. The process of claim 2 wherein the dimethyl sulfide and chlorine are employed in substantially stoichiometric proportions.

5. The process of claim 2 wherein the diluent gas comprises hydrogen chloride.

6. The process of claim 2 wherein the diluent gas comprises hydrogen chloride used in an amount of from 2–10 mols hydrogen chloride for each mol of dimethyl sulfide.

7. The process of making monochloro dimethyl sulfide which comprises reacting dimethyl sulfide and chlorine in the vapor phase at a temperature of from 34–300° C. and in the presence of a diluent gas comprising hydrogen chloride, the dimethyl sulfide and chlorine being employed in substantially equimolar proportions and the hydrogen chloride being employed in amount of from 2–10 mols hydrogen chloride for each mol dimethyl sulfide.

8. The process of claim 2 wherein the reaction is carried out at a temperature of between 100° C. and 250° C.

9. The process of claim 7 wherein the reaction is carried out at a temperature of from 100° C. to 250° C.

10. The process of making monochloro dimethyl sulfide which comprises introducing continuously into a reaction zone vaporized dimethyl sulfide, chlorine and hydrogen chloride gas, reacting the dimethyl sulfide and chlorine in the vapor phase at a temperature of between 100° C. and 250° C. to form a substantial amount of monochloro dimethyl sulfide, and withdrawing continuously the resultant monochloro dimethyl sulfide product from the reaction zone, the dimethyl sulfide and chlorine being employed in substantially equimolar amounts and the hydrogen chloride being employed in an amount of from 2–10 mols of hydrogen chloride for each mol of dimethyl sulfide.

11. The process of claim 10 wherein the dimethyl sulfide, chlorine, and hydrogen chloride are employed in substantially anhydrous form.

References Cited in the file of this patent

Boberg et al.: Liebig's Annalen, 616, 1–17 (1958), cited in Chemical Abstracts, 53, 1110a (1958).